United States Patent
Keiser (10) Patent No.: US 6,521,312 B1
(45) Date of Patent: Feb. 18, 2003

(54) MULTILAYERED FILM STRUCTURES AND METHODS OF MAKING AND USING THE SAME

(75) Inventor: LeRoy Herbert Keiser, Darien, IL (US)

(73) Assignee: Loparex, Inc., Willowbrook, IL (US)

( * ) Notice: Subject to any disclaimer, the term of this patent is extended or adjusted under 35 U.S.C. 154(b) by 0 days.

(21) Appl. No.: 09/723,941

(22) Filed: Nov. 28, 2000

(51) Int. Cl.[7] .......................... G09F 3/00; B32B 27/32; B32B 27/36
(52) U.S. Cl. ..................... 428/41.8; 428/42.1; 428/213; 428/215; 428/216; 428/352; 428/354; 428/412; 428/483; 428/515; 428/520; 428/910
(58) Field of Search .............................. 428/41.8, 42.1, 428/213, 215, 216, 352, 354, 483, 910, 515, 412, 520

(56) References Cited

U.S. PATENT DOCUMENTS

| 2,823,421 A | 2/1958 | Scarlett |
| 3,188,265 A | 6/1965 | Charbonneau et al. |
| 3,188,266 A | 6/1965 | Charbonneau et al. |
| 3,700,544 A | 10/1972 | Matsui |
| 4,211,825 A | 7/1980 | Shipman .................... 428/483 |
| 4,543,292 A | 9/1985 | Giles, Jr. et al. ............ 428/412 |
| 4,571,363 A | 2/1986 | Culbertson et al. ......... 428/332 |
| 4,775,594 A | 10/1988 | Desjarlais .................... 428/421 |
| 4,939,009 A | 7/1990 | Beavers et al. ............. 428/35.2 |
| 5,478,645 A | 12/1995 | Chang ........................ 428/347 |
| 5,591,522 A | 1/1997 | Sakai et al. ................. 428/353 |
| 5,637,366 A | 6/1997 | Davis et al. ................ 428/35.8 |
| 5,847,322 A | 12/1998 | Sakai et al. ............. 174/110 R |
| 5,922,428 A | 7/1999 | Pufahl ........................ 428/42.1 |
| 5,932,341 A | 8/1999 | Endo et al. .................. 428/327 |

OTHER PUBLICATIONS

Barry A. Morris, et al; *The Influence of Sealant Modulus On The Bending Stiffness of Multilayer Films*; 9 Pages; DuPont Packaging, Wilmington, Delaware, USA; originally presented at the 1997 TAPPI Polymers, Laminations and Coatings Conference, Aug. 24–28, Toronto, Ontario, Canada.

Van Leer Performance Films; Web Page; 2000; 3 Pages; Van Leer Flexibles, L.P., Houston, Texas, USA, Mar. 9, 2000.

*Primary Examiner*—D. S. Nakarani
(74) *Attorney, Agent, or Firm*—Wallenstein & Wagner, Ltd.

(57) ABSTRACT

Cost effective film laminates having desirable stiffness and processes for making the same are disclosed. The laminates include outer layers formed from one or more films having superior flexural modulus properties sandwiching a thicker yet less stiff polyolefin layer. The multilayered structures are suitable for use in applications which typically require a single heavy gauge film having a high degree of stiffness, such as release liners and the like.

25 Claims, 2 Drawing Sheets

MULTILAYERED FILM STRUCTURES AND METHODS OF MAKING AND USING THE SAME

FIELD OF THE INVENTION

The present invention relates to multilayered film structures, and in particular multilayered film structures having desirable flexural modulus properties, as well as methods of making the same and products incorporating the multilayered films as a component.

BACKGROUND OF THE INVENTION

Polymeric films, particularly biaxially oriented polymeric films, are used in a wide variety of applications. For example, biaxially oriented polyethylene terephthlate ("PET") film is employed in a range of applications due to its superior mechanical properties, temperature resistance, chemical inertness, and ready availability.

Biaxially oriented films are typically characterized by a higher flexural modulus than films possessing lower orientation. Biaxially oriented PET films are especially known to have superior stiffness, particularly heavy gauge (or thick) films, e.g, films having a thickness of about 76 micrometers or greater.

Typical applications for biaxially oriented heavy gauge PET films include photographic substrates, reprographic films such as drafting and engineering films, and microfilm. Additional markets continue to emerge for heavy gauge PET films, as well. For example, PET film provides a superior substrate for overhead transparencies, such as those produced on an ink jet printer. The use of film in conjunction with ink jet printing is discussed in greater detail in U.S. Pat. No. 4,775,594 to Desjarlais.

Also, due to its superior flexural modulus, biaxially oriented polyethylene terephthalate is especially well suited for use as a carrier or support substrate in heavy gauge release liners. Heavy gauge release liners are typically employed in the "secondary" label market. Exemplary applications within the secondary label market include fleet marking, e.g., the decals and signage placed on trucks, buses and the like, and labels for appliances.

Labels and decals are commonly provided as multicomponent systems that include a printed label stock adhered to a release liner. In general, print or ornamental designs are applied to an outer surface of label stock, commonly formed from paper or film. The opposing surface of the label stock is coated with an adhesive, for ease in label application. A release liner is typically applied to the exposed adhesive, protecting the adhesive coated label until use.

Release liners generally include a carrier or support substrate and a release layer applied to one or both surfaces thereof. The carrier substrate employed in secondary labels is typically fairly thick, e.g., 127 micrometers or more, primarily because such applications typically require superior stiffness.

To apply the label to a substrate surface, the release liner is peeled away from the printed label stock and discarded. Although the release liner is ultimately disposable, it must nonetheless possess sufficient durability to survive the stresses imparted during downstream processing and further possess sufficient cohesion to separate cleanly from the printed label stock.

Although possessing attractive mechanical properties, biaxially oriented PET films, especially heavy gauge PET film, can be expensive in comparison to other conventional films or paper based constructions. This price differential is especially problematic in highly competitive disposable applications, such as release liners.

Further, processes used to produce PET film can impose limitations on the attributes of the final product. For example, conventional polyethylene terephthalate is generally provided as an essentially clear or colorless film. However, markets for colored polyethylene terephthalate films currently exist and provide tremendous growth opportunity. White films, for example, are of interest as a replacement for the vellum currently employed in drafting films. In addition, ink jet or thermal transfer printing represents a significant market for white PET films, allowing the production of photographic quality computer generated prints. PET film is likewise beneficial in computer generated printing applications due to its superior stiffness and dimensional stability.

Opaque white PET films are commercially available; however, as noted previously, PET films can be expensive in comparison to other substrates. Further, opaque PET films are not commercially available in a wide range of colors. Transparent colored PET films may be produced by dyeing off-line, such as by immersing the film in a solvent based dye-bath. However, solvent dyeing involves the use of hazardous chemicals. Further, the cost structure involved in the manufacture of off-line dyed films is exacerbated, particularly for off-line dyed thick films.

SUMMARY OF THE INVENTION

The present invention provides multilayered structures with superior flexural modulus properties at a significantly reduced cost. The present invention further provides economical, environmentally friendly pigmented films likewise possessing the superior stiffness noted for biaxially oriented films.

The present invention is a multilayered structure which includes outer thermoplastic film layers sandwiching an inner layer formed of an unoriented olefinic polymer. The outer film layers of the structure are formed of a polymeric material that is stiffer than the olefinic material forming the intermediate layer. In particular, the outer film layers have a flexural modulus value exceeding 1500 MN/m$^2$, preferably about 3200 MN/m$^2$.

The inner layer has a lower flexural modulus value than either of the outer film layers. Stated differently, the inner olefinic layer is formed of a more flexible polymer. In addition, the inner olefinic layer has a greater thickness relative to the thickness of the individual outer film layers.

The inner olefinic layer can act as a bonding or "tie" layer to bond the outer film layers and the inner olefinic layer together to form a unitary structure so that the multilayered structure fails cohesively within a layer rather than adhesively between layers. The resultant multilayered structure of the invention has an overall or cumulative stiffness value exceeding the stiffness value of the intermediate layer. Surprisingly the inventors have found that such a multilayered structure can possess sufficient stiffness for use in applications requiring superior flexural modulus values, such as release liners and the like, despite the presence of a relatively flexible interior material.

Advantageously at least one, and preferably both, outer film layers are formed of biaxially oriented film. The outer film layers can be produced from a variety of polymers, including polyesters, biaxially oriented polypropylene, polycarbonates, polystyrene, and copolymers, terpolymers and blends thereof. In one currently preferred embodiment, at least one, and more preferably both, of the outer layers is formed from polyethylene terephthalate. The thickness of each the outer layers advantageously ranges from about 6 to about 75 micrometers, preferably from about 6 to about 51 micrometers, and more preferably from about 12 to about 36 micrometers.

Intermediate layers suitable for use in the multilayered structures include any of the types of olefinic polymers known in the art to be useful in extrusion coating. Exemplary polyolefins include homopolymers, copolymers, and terpolymers of an alpha-olefin having a carbon number ranging from about 2 to about 10. Exemplary alpha-olefins include high density polyethylene, low density polyethylene, polypropylene, polymethylpentene, and copolymers, terpolymers, and mixtures thereof. The intermediate layer can range in thickness from about 50 micrometers to about 100 micrometers. The intermediate layer may further contain one or more pigments. The presence of white pigments in the intermediate layer can be particularly advantageous in various end uses.

The multilayered structures of the present invention can be employed in any conventional thick, e.g. heavy gauge, film application. For example, a release coating can be applied to one or both surfaces of the multilayered structure to provide a release liner. The multilayered structures can also be coated with compositions that render the structures suitable for use in graphic arts, photographic, reprographic, and print receptive applications.

The multilayered structures of the present invention can be prepared using an extrusion coating or laminating process. Specifically, a surface of a film layer can be activated, either off-line or in-line, using conventional techniques such as corona treatment, chemical priming, flame treatment and the like. A surface of a second film layer can be similarly activated, also using conventional techniques. A suitable polyolefin resin is then heated and extruded as a molten film or sheet onto the activated surfaces of the film layers simultaneously to form a film/olefin structure. In an alternative embodiment, the polyolefin resin is initially extruded onto the activated surface of a first film layer. The activated surface of a second film layer is then placed into cooperating face-to-face relationship with the exposed olefinic surface to sandwich the olefinic material between the outer films layers and form a laminate structure. The resultant multilayered composite structure can be directed through a nip formed by cooperating pressure and chill rolls to solidify the molten polyolefin resin, thus forming a unitary multilayered composite structure. The product can then be directed to a winding roll or immediately directed to additional downstream process (such as in-line application of a release agent, etc.).

BRIEF DESCRIPTION OF THE DRAWINGS

Some of the features and advantages of the invention having been described, others will become apparent from the detailed description which follows and from the accompanying drawings, in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
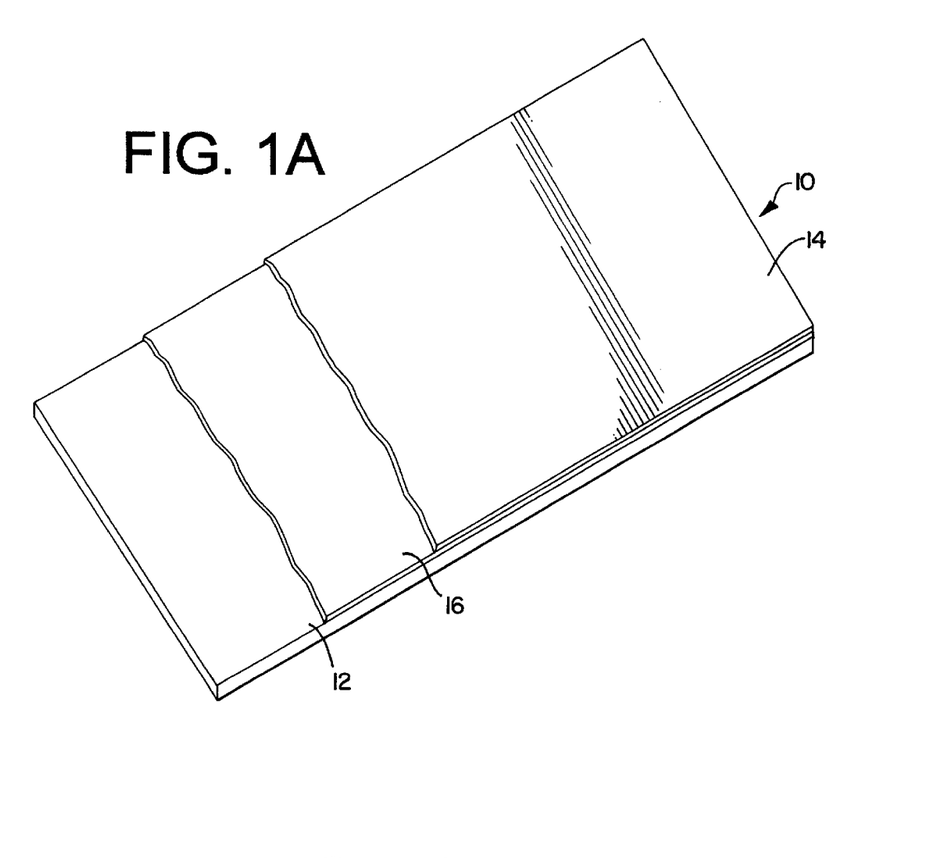
FIGS. 1A and 1B are respectively fragmentary top and side views of one illustrative embodiment of the multilayered film structure of the present invention with the respective layers of the top view of the laminate being exposed for clarity of illustration.
Figure 1B:
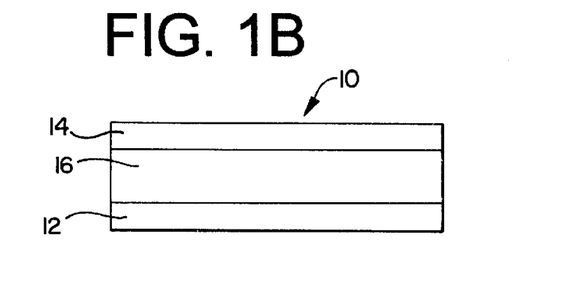

FIG. 1 provides fragmentary top and side views of one advantageous embodiment of the multilayer structure of the present invention, designated generally as 10. Generally, the multilayer structure 10 includes a first film layer 12 bonded to a second film layer 14 by an intermediate layer 16.

The first and second film layers 12 and 14 can be formed from any polymeric film having a flexural modulus value exceeding 1500 $MN/m^2$. Many biaxially oriented films would be expected to provide a suitably stiff film for use as first and second film layers 12 and 14. Exemplary polymeric films for use as layers 12 and 14 can be formed from thermoplastic polymers such as polyesters, biaxially oriented polypropylene, polycarbonates, polystyrene, and copolymers, terpolymers and blends thereof. Further, first and second film layers 12 and 14 can be formed from the same or different polymers. First and second film layers 12 and 14 can also contain conventional additives such as slip agents, antioxidants, heat stabilizers, UV stabilizers, and the like, as is known in the art.

In one particularly advantageous embodiment, at least one of the first and second film layers 12 and 14, and preferably both, are formed of polyester. Polyester polymers useful in the present invention include synthetic linear polyester that is well known to those skilled in the art and is obtained by condensing one or more dicarboxylic acids or their lower alkyl (up to 6 carbon atoms) diesters, e.g. terephthalic acid, isophthalic acid, phthalic acid, 2,5-,2,6-, or 2,7-naphthalenedicarboxylic acid, succininc acid, sebacic acid, adipic acid, azelaic acid, 4,4'-diphenyldicarboxylic acid, hexahydroterephthalic acid or 2-bis-p-carboxyphenoxyethane (optionally with a monocarboxylic acid, such as pivalic acid) the corresponding dicarboxylic acid diaklyl ester or lower alkyl ester with one or more glycols, e.g. ethylene glycol, 1,3-propanediol, 1,4-butanediol, neopentyl glycol, and 1,4-cyclohexanedimethanol. Preferably, the polyester polymer is obtained by condensing terephthalic acid or its dimethyl ester with ethylene glycol, i.e. the thermoplastic polymer is polyethylene terephthalate. Biaxially oriented polyethylene terephthalate film is particularly useful for at least one, and advantageously both, of outer film layers 12 and 14. An exemplary process by which to produce biaxially oriented polyethylene terephthalate film is provided in U.S. Pat. No. 2,823,421 to Scarlett. In advantageous aspects of the invention Mylarm$^{TM}$, produced by E. I. Dupont de Nemours and Co., can be employed as at least one of the first and second film layers.

The thickness of first and second film layers 12 and 14 can independently range from about 6 micrometers to about 75 micrometers, preferably from about 6 to about 51 micrometers, and more preferably ranging from about 12 micrometers to about 36 micrometers. In one particularly advantageous embodiment, a thermoplastic film of 23.4 micrometers, or 92 gauge, is employed for each of first and second layers 12 and 14.

One of the fimctions of first and second film layers 12 and 14 is to provide stiffness to the multilayer structure. In general, stiffness is a measure the propensity of a self-supported film to bend. Stiffness is a function of several variables, including polymer morphology, polymer composition and film thickness. As noted previously, biaxially oriented films can provide superior stiffness properties as compared to non-oriented films of comparable composition and thickness. Further, films formed of polymers such as polyethylene terephthalate and polystyrene are known to provide superior stiffness in comparison to other conventional films of comparable thickness. For example, polyethylene terephthalate film has a flexural modulus value of 3140 $MN/m^2$.

In contrast, films formed from olefinic polymers, such as those used to form the intermediate layer 16, typically do not possess the superior stiffness exhibited by the polymers forming first and second film layers 12 and 14. One factor contributing to the greater flexibility of olefinic films may be that they are generally employed as an unoriented film, applied by means such as extrusion coating and the like. For example, low density polyethylene ("LDPE") films are characterized by a flexural modulus value as low as 140 $MN/m^2$. Therefore, a given biaxially oriented polyethylene terephthalate film can be approximately 20 times as stiff as a film of comparable thickness formed from LDPE. For purposes of clarity, as defined herein, "stiffness" is proportional to the polymer modulus multiplied by the cube of the film thickness. However, although less stiff than other polymers, olefinic polymers do possess many other beneficial properties and further are generally more cost effective than the polymers comprising first and second layers 12 and 14.

Intermediate layer 16 can be formed of any of the types of olefinic resins known in the art to be useful in extrusion coating or laminating. Olefinic polymers formed of alpha-olefins having a carbon number ranging from about 2 to about 10 are particularly beneficial for use in the present invention. Examples of such olefinic polymers include ethylene homopolymers, copolymers, and terpolymers, such as high density polyethylene, low density polyethylene, and linear low density polyethylene; propylene homopolymers; polymethylpentene homopolymers; and copolymers, terpolymers, and blends thereof. Examples of copolymerizable monomers include alpha olefins such as styrene, vinyl acetate, acrylic acid, methyl acrylate, ethyl acrylate, acrylamide, methacrylic acid, methyl methacrylate, ethyl methacrylate, methacrylamide, 1-butene, 1-hexene, 1-octene; and diene compounds such as butadiene and isoprene. One particularly advantageous embodiment employs a copolymer of ethylene and methyl acrylate, such as SP2207 supplied by Eastman Chemical Company.

The olefinic polymer forming intermediate layer 16 may further contain a variety of additives as known in the art, such as but not limited to pigments, fluorescent agents, whitening agents, anti-oxidizing agents, antistatic agents, releasing agents, dispersing agents, fillers and the like. In one particularly advantageous embodiment, intermediate layer 16 contains at least one pigment. In one aspect of this embodiment, intermediate layer 16 includes a white pigment. Exemplary white pigments include titanium oxide, zinc oxide, zinc sulfide, and lithopone. In a further advantageous aspect, sufficient pigment can be added to intermediate layer 16 to render the multilayer structure 10 nearly or completely opaque. For example, intermediate layer 16 can include from about 1 wt % to about 25 wt % pigment, although amounts outside this range can also be employed.

The thickness of the intermediate layer 16 can vary. The thickness typically ranges from about 25 micrometers to about 125 micrometers, and preferably from about 50 micrometers to about 75 micrometers.

Intermediate layer 16 bonds first and second layers 12 and 14, thereby forming a unitary multilayer composite structure. In fact, sufficient adhesion may develop between the various layers to cause the laminate to fail cohesively rather than delaminate. Stated differently, the composite structure can form a destructive bond, i.e., the laminate fails within one of its layers rather than failing between layers.

The significant level of adhesion which develops within the multilayered structure gives rise to certain synergistic properties. In particular, the stiffness achieved within the multilayer structure 10 exceeds the stiffness of intermediate layer 16. Indeed, the stiffness of the multilayer structure 10 exceeds the stiffness of each of the component layers. Further, the flexural modulus of the multilayer structure 10 can be sufficient to allow its use in applications requiring superior stiffness. Thus, the present invention can provide a multilayer structure having superior stiffness at a significant cost reduction.

Although not wishing to be bound by theory or explanation of the invention, the inventors currently believe that the mechanical behavior of film laminates can generally be described by reference to I-beam behavior or bending stiffness theory. For example, beam theory has been used to determine that unsymmetrical packaging film laminates can be downgauged by substituting ionomer resin for more flexible conventional heat sealable resins, such as metallocene polyethylene. However, rather than employing I-beam theory as a tool for downgauging unsymmetrical film constructions, the present inventors found that a mono- or single layer film of superior stiffness, such as a thick PET film, can be replaced by symmetrical laminates comprising thin outer layers of high flexural modulus film bonded by a thicker layer of significantly lower modulus and less expensive material.

For example, the bulk of an oriented PET monolayer film can be replaced with polymer that has an order of magnitude lower flexural modulus, such as LDPE, without undue sacrifice to the overall stiffness of the resulting laminate. In fact, by only slightly increasing the thickness of multilayered film, e.g., by increasing the thickness of the more flexible layer by 5 to 20%, a structure having flexural properties equivalent to a PET monolayer film of a given thickness can be provided. Thus, surprisingly the inventors have found that a significant portion of polymer characterized by superior stiffness can be replaced with considerably less stiff polymer, e.g. polymer having about $1/20^{th}$ the stiffness of the stiffer polymer, and nevertheless yield a laminate suitable for use in applications requiring significant stiffness.

As an additional benefit, the outer film layers typically possess superior heat resistance. Therefore, the multilayered films of the present invention can be employed in processes utilizing elevated temperatures. For example, the multilayered films of the present invention can be used in processes ranging in temperature from 88 to 95° C. The present multilayered films can therefore be used at higher temperatures than monolayer films formed from lower modulus polymers, such as low density polyethylene or high density polyethylene. In fact, the present multilayered films can be used to replace the polyethylene coated papers currently employed in many elevated temperature applications.

Figure 2:
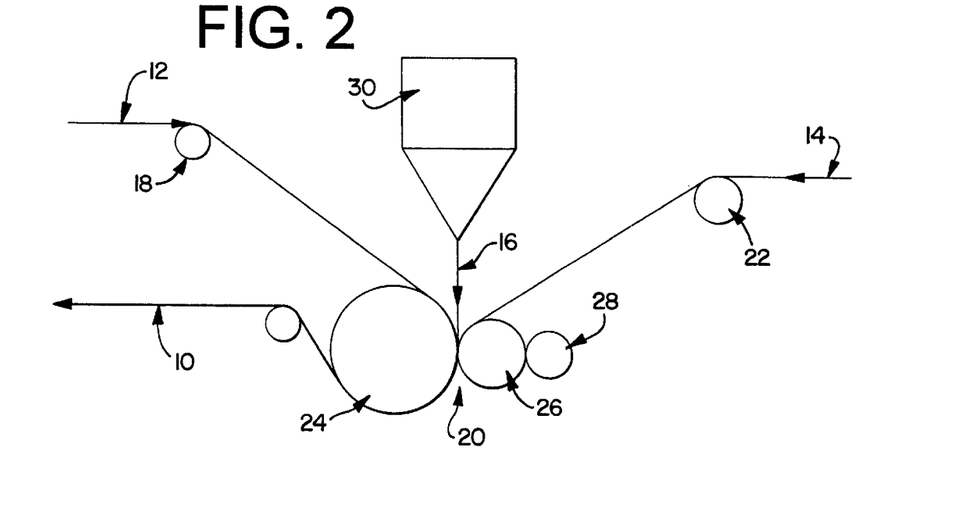
FIG. 2 is a schematic representation of an exemplary process for making the multilayered film structures of the present invention.

Turning now to FIG. 2, an exemplary process for producing the multilayer structures of the present invention is illustrated. As shown in FIG. 2, a first film layer 12 is directed by a roll 18 towards a laminating nip 20. A surface of first film layer 12 that will contact intermediate layer 16 is activated prior to entering the laminating nip 20. Typically, a surface of film layer 12 is activated in-line immediately prior to entering the laminating nip 20. Alternatively, the surface of the first film layer 12 is activated off-line. An exemplary activated PET film is commercially available as Mylar™ 820 from E. I. Dupont de Nemours, and Company.

Surface activation promotes adhesion between the outer film layers 12 and 14 and the intermediate layer 16. The surface of the first film layer 12 may be activated by any of numerous methods known in the art, including corona treatment, chemical priming, chemical etching, flame treatment and the like. A typical chemical priming process includes applying a thin layer of reactive material, such as polyethyleneimine, to the surface of the film, by methods such as aqueous coating and the like, as is known in the art. In one advantageous embodiment, the surface of the first film layer is subjected to both corona treatment and chemical priming prior to the bonding with the intermediate layer.

A second film layer 14 is directed by a roll 22 to the opposite side of the laminating nip 20. The surface of the second film layer 14 intended to contact the intermediate layer 16 is likewise activated prior to entering the laminating nip 20. Any activation method suitable for use with the first film layer 12 is suitable for use with the second film layer 14, as well.

As shown in FIG. 2, the intermediate layer 16 is extruded simultaneously between the activated surfaces of the first film layer 12 and the second film layer 14. Stated differently, both the first and the second film layers 12 and 14 are directed into the laminating nip 20 in a surface-to-surface relationship with a molten intermediate layer 16 issuing from the extruder 30. In an alternative embodiment, the intermediate layer 16 is extruded onto the activated surface of one of the outer film layers prior to contacting the other film layer. For example, the intermediate layer 16 can be extruded onto the activated surface of the first film layer 12 prior to contacting the activated second film layer 14, rather than employing the simultaneous contact illustrated in FIG. 2.

The first and second film layers 12 and 14, with an intermediate layer 16 of molten extruded olefinic resin therebetween, are then directed into a laminating nip 20 formed by a chill roll 24 and a pressure roll 26. Chill roll 24 can be cooled using conventional techniques, for example by passing a cooling medium (e.g., water) through the interior thereof. The temperature of chill roll 24 is generally maintained from about 12° to about 24° C.

Chill roll 24 is typically a cylindrical metal chill roll with a chromium coating applied to the outer surface thereof. The cylindrical roll can be formed of a variety of metals, such as the various steels, aluminum, and the like, as well as alloys thereof. The surface of chill roll 24 is typically smooth, as is known in the art.

The laminating pressure between pressure roll 26 and chill roll 24 is adjusted and maintained by contacting a pressure back-up roll 28 against the pressure roll 26. The pressure roll 26 is typically a rubber covered roll having a Shore A durometer hardness ranging from about 70 to about 95. Other materials having a similar hardness and resiliency as rubber may optionally be used to form the pressure roll 26. The pressure back-up roll 28 urges the pressure roll 26 toward the chill roll 24 and may itself be cooled by passing a cooling medium such as water through the interior thereof. The pressure between the pressure roll 26 and chill roll 24 as applied by the pressure back-up roll 28 generally ranges from about 14 kN/m to about 140 kN/m, and preferably ranges from about 17.5 kN/m to about 52.5 kN/m. As the multilayered structure 10 passes through the laminating nip 20 formed by the chill roll 24 and the pressure roll 26, the film layers 12 and 14 are adhered as the molten intermediate layer 16 is solidified by the chill roll 24. Following solidification of the intermediate layer 16, the multilayered film structure is taken up on a winder (not shown).

The olefinic polymer forming intermediate layer 16 can be extruded from extruder 30 using conventional conditions and procedures. For example, as the skilled artisan will appreciate, the extrusion temperature suitable for processing the olefinic polymer will vary depending upon the specific resin used but typically ranges from about 200° C. (392° F.) to about 345° C. (650° F.). Exemplary melt indices for the olefinic polymer range from about 2 to about 25. The resin is extruded at a rate so as to form an intermediate layer 16 having a thickness ranging from about 25 micrometers to about 125 micrometers, preferably from about 50 to about 75. The weight of intermediate layer 16 can vary, and typically ranges from about 24 grams per square meter to about 120 grams per square meter, preferably from about 48 grams per square meter to about 72 grams per square meter, although extrusion coating weights outside of these ranges can also be used. The extrusion rate from extruder 30 is further coordinated with the running speed of first and second film layers 12 and 14 which typically ranges from about 50 meters per minute up to about 400 meters per minute.

Variations of the extrusion processing conditions will be appreciated by those skilled in the art, such as increasing or decreasing extrusion temperature or web speed, varying the thickness of the intermediate layer 16, modification of nip pressure and/or pressure roll hardness, and other process conditions.

Figure 3:
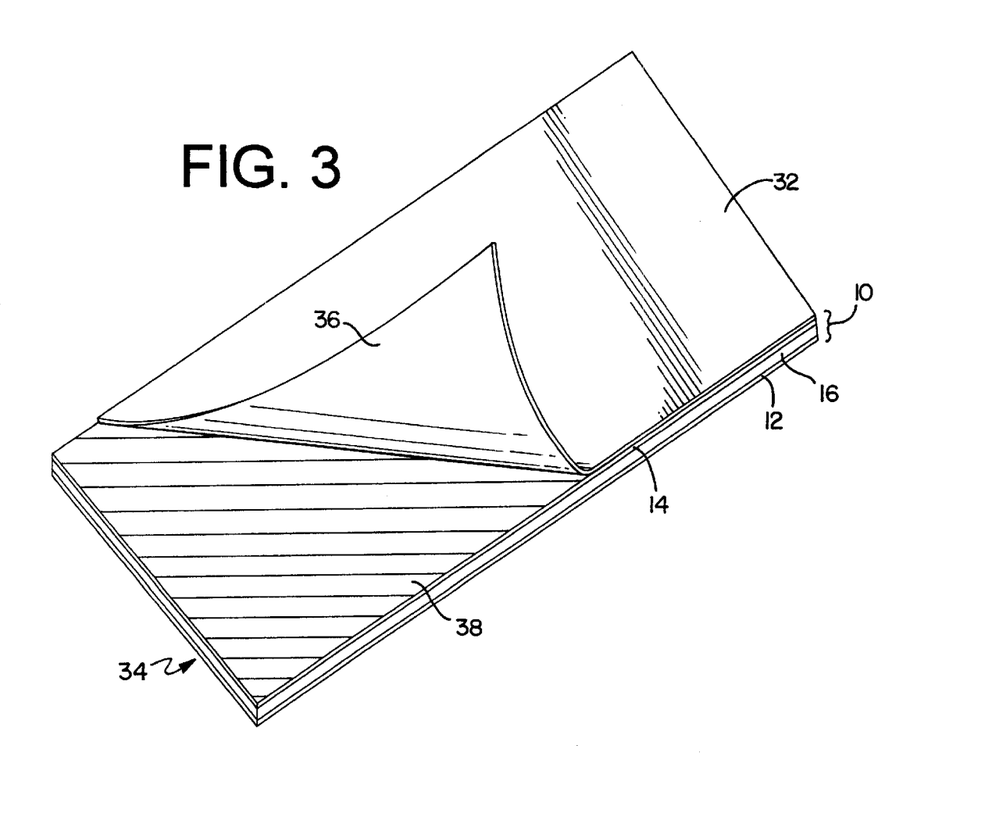
FIG. 3 is a top view of an illustrative label formed in accordance with one advantageous embodiment of the present invention, with the top layer peeled away for clarity of illustration.

FIG. 3 illustrates another aspect of the invention, namely, a label incorporating a release liner formed in accordance with one advantageous aspect of the present invention. In general, labels are multicomponent structures comprised of printed labelstock 32 bonded to a release liner 34 via an adhesive layer 36. The release liner 34 is formed from multilayer film 10, coated with a release layer 38. The release layer 38 can include any of the types of agents known in the art which impart release properties to a substrate. For example, the release layer 38 can be a coating of a release agent, such as a fluoropolymer, silicone, chromium complexes of long chain fatty acids, and the like. Typically, such release agents are cured by any of several techniques, including the use of either heat or electromagnetic radiation, such as ultraviolet (UV), electron beam, and the like. The release layer 38 can also be cured by evaporative processes as known in the art, i.e., dried to remove solvent. Exemplary release agents include without limitation SYL-OFF® 294 with Dow Corning 176 Catalyst, commercially available from Dow Corning; UV9315 with UV9310C catalyst, commercially available from General Electric Silicones, and Quilon®, commercially available from E. I. DuPont. Corona treatment or flame treatment can advantageously be used to promote adhesion of the release layer 38 to the surface of the multilayer structure 10. Release layer 38 has a thickness sufficient to impart the desired release properties to the multilayer structure 10 and typically ranges from about 0.02 micrometers to about 1.6 micrometers.

The release liner 34 can also be used in combination with other sheet materials as known in the art. For example, adhesive can be applied to release layer 38 of the release liner 34 so as to form an adhesive layer that is releasably adhered to release liner 34. The adhesive layer/release liner composite structure can thereafter be directed into a face-to-face relationship with a suitable substrate (which can be any of the types of substrates described above) to form a release liner/adhesive/substrate structure such that the adhesive layer is sandwiched between the substrate and release liner sheet. The adhesive layer can be formed of various suitable conventional adhesives known in the art, and preferably is a pressure sensitive adhesive. Advantageously a surface thereof opposite the adhesive layer is rendered receptive to printed indicia using techniques known in the art, such as corona treatment, application of an additional layer to the substrate surface which is receptive to printed indicia, and the like. Alternatively, the adhesive may be sandwiched between two release liners to form an unsupported adhesive construction.

Although the multilayer film structure of the invention has been described above as a useful supporting substrate in a release liner application, the structures of the invention can be useful as a substitute for thick films in other applications, as well. The multilayered film structures of the present invention are particularly well suited as thick film replacements in reprographic applications. Reprographic end uses include those applications in which an exact replica of an original reference is produced, such as printer film, drafting film, overhead transparencies, microfilm, and the like. In general, coatings, such as solvent based cellulosic or aqueous based polyvinyl alcohol coatings, are applied to at least one of the outer surfaces of the multilayered structure to render it suitable for use in reprographic applications, as is known in the art. For example, a suitable coating for ink jet receptive films is described in U.S. Pat. No. 4,775,594 to Desjarlais. Further, the surface of the multilayer film structure can be activated to promote adequate adhesion between the multilayered structure and the reprographic coating. It can further be advantageous in such reprographic applications to apply a primer coating to the activated surface of the multilayer film laminate prior to applying a reprographic coating, as disclosed in U.S. Pat. No. 4,571,363 to Culbertson.

Those aspects of the invention comprising a pigmented intermediate layer are especially well suited for computer generated printing applications and the like. As noted previously, a great number of conventional commodity thick films, particularly polyester, are clear, or substantially colorless. In contrast, the olefinic polymers forming the intermediate layer are readily pigmented prior to extrusion. Thus, by including pigment in the intermediate layer a thick film having both color and significant stiffness is provided at a substantial cost reduction. Multilayered films which have been rendered white, especially an opaque white, are particularly advantageous as print media for inkjet printers. As noted previously, such opaque films may be used to produce computer generated prints approaching photographic quality. Additional applications for opaque white films include substrates for photographic prints. Appropriate photographic print coatings may be applied to the multilayered film, as is known in the art.

The present invention will be further described by the following non-limiting examples.

EXAMPLE 1

A first roll of 92 gauge polyethylene terephthalate film was subjected to an activation process comprising corona treatment and polyethyleneimine primer. The corona treatment subjected the film surface to approximately 0.35 J/cm$^2$ of energy. Approximately 0.1 g/m$^2$ of polyethyleneimine, available as Lupasol Polymin PS (a 33% by weight solution of polyethyleneimine), was applied to the treated surface.

The activated roll of PET film was then mounted on the unwind stand of the extrusion coater and passed through a laminating nip essentially as shown in the schematic diagram in FIG. 2. A second roll of 92 gauge polyethylene terephthalate was activated using the same procedure employed with the first film. The activated second film was likewise fed from an unwind roll through a laminating nip essentially as shown in the schematic diagram in FIG. 2. The PET films employed were Mylar™ Type A from E. I. Dupont de Nemours, and Company. An ethylene methyl acrylate copolymer was extruded at a rate of 45 Kg/hr from the die at a temperature of 305° C. into the laminating nip, contacting the activated surfaces of both layers of PET film simultaneously. The ethylene methyl acrylate copolymer is available as SP2207 from Eastman Chemical Company. The ethylene methyl acrylate copolymer had a melt index of 6.

The PET films were adhered by passing through a chilled laminating nip, as shown in FIG. 2. The pressure in the laminating nip was 26 kN/m. The ethylene copolymer was solidified into a 75 micrometers thick layer by contacting the multilayer structure with a chill roll at a temperature of 18° C. The unitary multilayered film was subsequently wound up into a roll at the winder. The line speed was 27 meters per minute. When subjected to adhesion testing, the film failed cohesively within the ethylene copolymer layer. The multilayered film further exhibited sufficient stiffness for use as a release liner, particularly as a release liner for secondary labels.

EXAMPLES 2–37

The following examples are presented to illustrate the breadth of the various embodiments available within the scope of the present invention. These samples can be prepared following the procedures provided in Example 1. In particular, a range of symmetrical structures formed from PET outer layers sandwiching an inner polymer layer can be prepared. Predicted stiffness values for various PET monolayer constructions and multilayer configurations using PET outer layers were calculated based on principles gleaned from general bending stiffness theory. For example, the stiffness of a homogeneous layer of PET film may be calculated using an equation such as:

$$HS = (M_H)\left(\frac{W_H T_H^3}{12}\right)$$

Wherein:
  HS=Stiffness of Homogeneous Layer of PET Film, N*m$^2$
  $M_H$=Modulus of Homogeneous Layer of PET Film=3140 MN/m$^2$
  $W_H$=Width of homogeneous sample, m
  $T_H$=Thickness of homogeneous sample, m
  Based on theoretical sample dimensions of 10 inches by 1 inch, the stiffness of a homogeneous 5 mil layer of PET film was determined to be 0.0136 mN*m². The stiffness of a homogeneous 4 mil layer of PET film of the same sample dimensions was determined to be 0.0070 mN*m².

The stiffness of a three layer film laminate having outer PET film layers may be calculated using an equation such as:

$$LS = (M_T)\left(\frac{W_T T_T^3}{12} + W_T T_T D_T^2\right) + (M_M)\left(\frac{W_M T_M^3}{12} + W_M T_M D_M^2\right) + (M_B)\left(\frac{W_B T_B^3}{12} + W_B T_B D_B^2\right)$$

Wherein:

LS = Laminate Stiffness = N*m²

$M_T$ = Modulus of top layer of sample, 3140 MN/m²

$M_M$ = Modulus of middle layer of sample, MN/m²

$M_B$ = Modulus of bottom layer of sample, 3140 MN/m²

$T_T$ = Thickness of top layer of sample, m $T_M$ = Thickness of middle layer of sample, m $T_B$ = Thickness of bottom layer of sample, m $D_T$ = Distance between center of top layer and centroid, m $D_M$ = Distance between center of middle layer and centroid, m $D_B$ = Distance between center of bottom layer and centroid, m $W_T$ = Width of top layer of sample, m $W_M$ = Width of middle layer of sample, m $W_B$ = Width of bottom layer of sample, m The laminate stiffness calculations were likewise based on theoretical sample dimensions of 10 inches by 1 inch. The calculated stiffness for each multilayered film combination was then compared to the stiffness of a comparable PET monolayer, i.e. homogenous, film. The results for the various samples are provided in Tables 1–4 below.

TABLE 1

STIFFNESS OF MULTILAYERED FILM IN COMPARISON TO 5 MIL PET

| Example No. | PET Thickness (gauge) | Inner Layer Polymer | Inner Layer Thickness (Mils) | Total Thickness (Mils) | Percent Of 5 Mil PET Stiffness |
|---|---|---|---|---|---|
| 2 | 48[1] | LDPE[2] | 4.08 | 5.0 | 51 |
| 3 | 75 | LDPE | 3.50 | 5.0 | 67 |
| 4 | 92 | LDPE | 3.16 | 5.0 | 76 |
| 5 | 48 | HDPE[3] | 4.04 | 5.0 | 61 |
| 6 | 75 | HDPE | 3.50 | 5.0 | 75 |
| 7 | 92 | HDPE | 3.16 | 5.0 | 81 |
| 8 | 48 | PP[4] | 4.04 | 5.0 | 73 |
| 9 | 75 | PP | 3.50 | 5.0 | 82 |
| 10 | 92 | PP | 3.16 | 5.0 | 87 |

[1]The modulus of PET is 3140 MN/m²
[2]The modulus of LDPE is 140 MN/m²
[3]The modulus of HDPE is 840 MN/m²
[4]The modulus of PP is 1400 MN/m²

TABLE 2

STIFFNESS OF MULTILAYERED FILM IN COMPARISON TO 4 MIL PET

| Example No. | PET Thickness (gauge) | Inner Layer Polymer | Inner Layer Thickness (Mils) | Total Thickness (Mils) | Percent Of 4 Mil PET Stiffness |
|---|---|---|---|---|---|
| 11 | 48[1] | LDPE[2] | 3.04 | 4.0 | 59 |
| 12 | 75 | LDPE | 2.50 | 4.0 | 76 |
| 13 | 92 | LDPE | 2.16 | 4.0 | 84 |
| 14 | 48 | HDPE[3] | 3.04 | 4.0 | 69 |
| 15 | 75 | HDPE | 2.50 | 4.0 | 82 |
| 16 | 92 | HDPE | 2.16 | 4.0 | 84 |
| 17 | 48 | PP[4] | 3.04 | 4.0 | 78 |
| 18 | 75 | PP | 2.5 | 4.0 | 88 |
| 19 | 92 | PP | 2.16 | 4.0 | 92 |

[1]The modulus of PET is 3140 MN/m²
[2]The modulus of LDPE is 140 MN/m²
[3]The modulus of HDPE is 840 MN/m²
[4]The modulus of PP is 1400 MN/m²

TABLE 3

MULTILAYERED FILM THICKNESS REQUIRED TO MATCH 5 MIL PET STIFFNESS

| Example No. | PET Thickness (gauge) | Inner Layer Polymer | Inner Layer Thickness (Mils) | Total Thickness (Mils) |
|---|---|---|---|---|
| 20 | 48[1] | LDPE[2] | 5.85 | 6.81 |
| 21 | 75 | LDPE | 4.43 | 5.93 |
| 22 | 92 | LDPE | 3.76 | 5.60 |
| 23 | 48 | HDPE[3] | 5.09 | 6.05 |
| 24 | 75 | HDPE | 4.1 | 5.60 |
| 25 | 92 | HDPE | 3.58 | 5.40 |
| 26 | 48 | PP[4] | 4.65 | 5.6 |
| 27 | 75 | PP | 3.86 | 5.36 |
| 28 | 92 | PP | 3.42 | 5.30 |

[1]The modulus of PET is 3140 MN/m²
[2]The modulus of LDPE is 140 MN/m²
[3]The modulus of HDPE is 840 MN/m²
[4]The modulus of PP is 1400 MN/m²

TABLE 4

MULTILAYERED FILM THICKNESS REQUIRED TO MATCH 4 MIL PET STIFFNESS

| Example No. | PET Thickness (gauge) | Inner Layer Polymer | Inner Layer Thickness (Mils) | Total Thickness (Mils) |
|---|---|---|---|---|
| 29 | 48 | LDPE[2] | 4.08 | 5.00 |
| 30 | 75 | LDPE | 2.95 | 4.45 |
| 31 | 92 | LDPE | 2.43 | 4.27 |
| 32 | 48 | HDPE[3] | 3.07 | 4.62 |
| 33 | 75 | HDPE | 2.8 | 4.30 |
| 34 | 92 | HDPE | 2.43 | 4.27 |
| 35 | 48 | PP[4] | 3.43 | 4.39 |
| 36 | 75 | PP | 2.68 | 4.18 |
| 37 | 92 | PP | 2.28 | 4.10 |

[1]The modulus of PET is 3140 MN/m²
[2]The modulus of LDPE is 140 MN/m²
[3]The modulus of HDPE is 840 MN/m²
[4]The modulus of PP is 1400 MN/m²

As shown in Tables 1 and 2, the multilayered films of the present invention can exhibit a lower overall stiffness than a monolayer film of comparable thickness formed from PET alone. However, for many applications, such as release liners and the like, an adequately stiff product results, particularly in light of the significant cost savings provided. For example, multilayered films exhibiting at least 70% of the stiffness value exhibited by a monolayer PET film of comparable thickness can readily be provided. Such films would be expected to be suitable in a wide range of applications, including as secondary market label release liners.

Further, as indicated in Tables 3 and 4, multilayer films having stifflesses comparable to monolayer PET films can also be readily provided. In particular, by increasing the overall thickness of the laminate by an amount ranging from about 2% up to about 36% and/or employing thicker outer layers, a multilayer structure having a stiffness equivalent to a 4 or 5 mil monolayer PET film can be produced.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A multilayer structure comprising:
   (a) first and second outer film layers, each comprising at least one thermoplastic polymer, each of said first and second outer film layers defining a thickness and further having a flexural modulus value exceeding 1500 MN/m$^2$; and
   (b) an intermediate layer comprising at least one unoriented olefinic polymer disposed between and bonding said first and second outer film layers to form a unitary multilayer composite structure, said intermediate layer having a flexural modulus value which is less than the flexural modulus value of each of said first and second outer film layers and a thickness that is greater than the thickness of either of the first and second outer film layers,
   said unitary multilayer structure having an adhesion strength between said intermediate layer and said first and second outer film layers that is greater than the cohesive strength of at least one of said first, second, and intermediate layers, said unitary multilayer structure further having a flexural modulus value greater than the flexural modulus value of said intermediate layer.

2. The multilayer structure of claim 1, wherein said multilayer structure exhibits at least 70% of the stiffness value exhibited by a single film formed of the said thermoplastic polymer of said first or second film layers and having substantially the same thickness as said multilayered structure.

3. The multilayer structure of claim 1, wherein at least one of said first and second film layers is a biaxially oriented film layer.

4. The multilayer structure of claim 1, wherein both of said first and second film layers are biaxially oriented film layers.

5. The multilayer structure of claim 1, wherein said olefinic polymer is a homopolymer, copolymer or terpolymer of an alpha-olefin having a carbon number ranging from about 2 to about 10.

6. The multilayer structure of claim 5, wherein said olefinic polymer is selected from the group consisting of high density polyethylene, low density polyethylene, polypropylene, polymethylpentene, and copolymers, terpolymers and mixtures thereof.

7. The multilayer structure of claim 6, wherein said olefinic polymer is a copolymer of ethylene and one or more acrylates or methacrylates.

8. The multilayer structure of claim 1, wherein said first and second film layers each comprise a thermoplastic polymer independently selected from the group consisting of polyesters, biaxially oriented polypropylene, polycarbonates, polystyrene and copolymers, terpolymers and blends thereof.

9. The multilayer structure of claim 8, wherein at least one of said first and second film layers comprises polyester.

10. The multilayer structure of claim 9, wherein each of said first and second film layers comprises polyethylene terephthalate.

11. The multilayer structure of claim 1, wherein said each of said first and second layers has a thickness ranging from about 6 micrometers to about 75 micrometers.

12. The multilayer structure of claim 11, wherein said each of said first and second layers has a thickness ranging from about 12 micrometers to about 36 micrometers.

13. The multilayer structure of claim 1, wherein said intermediate layer has a thickness ranging from about 50 micrometers to about 100 micrometers.

14. The multilayer structure of claim 1, wherein said intermediate layer further comprises at least one pigment.

15. The multilayer structure of claim 14, wherein said at least one pigment is white.

16. The multilayer structure of claim 1, wherein each of said first and second layers comprises biaxially oriented polyethylene terephthalate film having a thickness of about 1 mil and said intermediate layer comprises an ethylene methyl acrylate copolymer having a thickness of about 3 mil.

17. The multilayer structure of claim 1, wherein at least one of said first or second layers further comprises a coating on a surface opposite the surface thereof adjacent said intermediate layer.

18. The multilayer structure of claim 17, wherein said coating is selected from the group consisting of release coatings, reprographic coatings, photographic print coatings and print receptive coatings.

19. The multilayer structure of claim 18, wherein said print receptive coating is an ink jet receptive coating.

20. A release liner comprising:
   a multilayer structure comprising (a) first and second film layers, each comprising at least one thermoplastic polymer, each of said first and second film layers defining a thickness and further having a flexural modulus value exceeding 1500 MN/m$^2$; and (b) an intermediate layer comprising at least one unoriented olefinic polymer disposed between and bonding said first and second film layers to form a unitary multilayer composite structure, said intermediate layer having a flexural modulus value which is less than the flexural modulus value of each of said first and second layers and a thickness that is greater than the thickness of either of the first and second film layers, said unitary multilayer structure having an adhesion strength between said intermediate layer and said first and second film layers that is greater than the cohesive strength of at least one of said first, second, and intermediate layers, said unitary multilayer structure further having a flexural modulus value greater than the flexural modulus value of said intermediate layer; and
   a release coating on at least one outer surface of said multilayer structure.

21. A label comprising:

a release liner comprising (a) first and second film layers, each comprising at least one thermoplastic polymer, each of said first and second film layers defining a thickness and further having a flexural modulus value exceeding 1500 MN/m$^2$; and (b) an intermediate layer comprising at least one unoriented olefinic polymer disposed between and bonding said first and second film layers to form a unitary multilayer composite structure, said intermediate layer having a flexural modulus value which is less than the flexural modulus value of each of said first and second layers and a thickness that is greater than the thickness of either of the first and second film layers, said unitary multilayer structure having an adhesion strength between said intermediate layer and said first and second film layers that is greater than the cohesive strength of at least one of said first, second, and intermediate layers, said unitary multilayer structure further having a flexural modulus value greater than the flexural modulus value of said intermediate layer;

a release coating on at least one outer surface of said multilayer structure; and a third film layer adjacent an outer surface of said release coating and having an outer surface opposite said release coating that is rendered receptive to receipt of printed indicia and an inner surface adjacent said release coating that further comprises a pressure sensitive adhesive.

22. The label of claim 21, further comprising printed indicia on said outer surface.

23. A colored multilayer structure comprising:

(a) first and second outer layers, each comprising at least one thermoplastic polymer, each of said first and second outer film layers defining a thickness and further having a flexural modulus value exceeding 1500 MN/m$^2$; and (b) an intermediate layer comprises a pigment and formed of at least one unoriented olefinic polymer disposed between and bonding said first and second outer film layers to form a unitary multilayer composite structure, said intermediate layer having a flexural modulus value which is less than the flexural modulus value of each of said first and second outer film layers and a thickness that is greater than the thickness of either of the first and second outer film layers, said unitary multilayer structure having an adhesion strength between said intermediate layer and said first and second outer film layers that is greater than the cohesive strength of at least one of said first, second, and intermediate layers, said unitary multilayer structure further having a flexural modulus value greater than the flexural modulus value of said intermediate layer.

24. The colored film of claim 23, wherein said pigment is white.

25. A photographic print substrate comprising:

a multilayer structure of (a) first and second film layers, each comprising at least one thermoplastic polymer, each of said first and second film layers defining a thickness and further having a flexural modulus value exceeding 1500 MN/m$^2$; and (b) an intermediate layer comprising at least one unoriented olefinic polymer disposed between and bonding said first and second film layers to form a unitary multilayer composite structure, said intermediate layer having a flexural modulus value which is less than the flexural modulus value of each of said first and second layers and a thickness that is greater than the thickness of either of the first and second film layers, said unitary multilayer structure having an adhesion strength between said intermediate layer and said first and second film layers that is greater than the cohesive strength of at least one of said first, second, and intermediate layers, said unitary multilayer structure further having a flexural modulus value greater than the flexural modulus value of said intermediate layer; and at least one gelatin sub layer and a photographic emulsion layer on at least one outer surface of said multilayer composite structure.

* * * * *